United States Patent [19]

Jarmon et al.

[11] Patent Number: 4,960,629

[45] Date of Patent: Oct. 2, 1990

[54] FIBER REINFORCED COMPOSITE ARTICLE

[75] Inventors: David C. Jarmon, Kensington; Karl M. Prewo, Vernon, both of Conn.

[73] Assignee: United Technologies Corporation, Hartford, Conn.

[21] Appl. No.: 372,104

[22] Filed: Jun. 28, 1989

Related U.S. Application Data

[63] Continuation of Ser. No. 132,398, Dec. 15, 1987, abandoned.

[51] Int. Cl.⁵ .................. B32B 5/12; B32B 15/00; B32B 5/06
[52] U.S. Cl. .................................... 428/113; 428/114; 428/284; 428/294; 428/297; 428/298; 428/367; 428/408; 428/902
[58] Field of Search .............. 428/113, 296, 294, 902, 428/367, 297, 284, 298, 408

[56] References Cited

U.S. PATENT DOCUMENTS

| | | | |
|---|---|---|---|
| H347 | 10/1987 | Layden et al. | 428/294 |
| 4,256,378 | 3/1981 | Prewo et al. | 350/310 |
| 4,268,562 | 5/1981 | Bacon et al. | 428/113 |
| 4,324,843 | 4/1982 | Brennan et al. | 428/294 |
| 4,341,826 | 7/1982 | Prewo et al. | 428/35 |
| 4,460,638 | 7/1984 | Haluska | 428/294 |
| 4,460,639 | 7/1984 | Chi et al. | 428/224 |
| 4,460,640 | 7/1984 | Chi et al. | 428/294 |
| 4,554,197 | 11/1985 | Chyung et al. | 428/294 |
| 4,613,473 | 9/1986 | Layden et al. | 464/103 |
| 4,626,461 | 12/1986 | Prewo et al. | 428/113 |
| 4,738,902 | 4/1988 | Prewo et al. | 428/294 |

*Primary Examiner*—George F. Lesmes
*Assistant Examiner*—James Withers
*Attorney, Agent, or Firm*—Troxell K. Snyder

[57] ABSTRACT

A fiber reinforced glass composite article is disclosed. The article comprises from about 20 volume percent to about 50 volume percent of a glass or glass ceramic matrix, from about 5 volume percent to about 50 volume percent monofilament fiber reinforcement and from about 15 volume percent to about 50 percent yarn fiber reinforcement. The monofilament fiber reinforcement and yarn fiber reinforcement are selectively distributed in the glass matrix to provide a fiber reinforced composite article which exhibits high tensile strength, high elastic modulus, high fracture toughness.

6 Claims, 1 Drawing Sheet

(50 X)

(200 X)

FIBER REINFORCED COMPOSITE ARTICLE

DESCRIPTION

This invention was made with Government support under Contract N00014-81-C-0571 awarded by the Department of Navy. The Government has certain rights in this invention.

This invention is a continuation of application Ser. No. 07/132,398, filed Dec. 15, 1987, now abandoned.

1. Cross Reference to Related Applications

This invention is related to the invention disclosed in copending patent applications entitled "Process for Making a Reinforced Composite Article" issued as U.S. Pat. No. 4,909,782 on Mar. 20, 1990 and "Rotor for Gas Turbine Engine" issued as U.S. Pat. No. 4,808,076 on Feb. 28, 1989, filed by David C. Jarmon; and David C. Jarmon and Karl M. Prewo, respectively on even date and assigned to the same assignee of this application.

2. Technical Field

The technical field to which this invention pertains is that of fiber reinforced composites.

BACKGROUND ART

It has been widely recognized, particularly within the aerospace and automotive industries, that the selective use of fiber reinforced composite materials to replace metals can result in significant performance benefits. These benefits flow from the exceptional combination of high stiffness, high strength and low density that typically characterize fiber reinforced composite materials and from the ability to tailor the properties of a particular composite article to fit the demands of a particular application.

Fiber reinforced glass matrix and fiber reinforced glass ceramic matrix composites have been developed for high temperature applications. These materials exhibit high strength, high modulus, and high fracture toughness at temperatures which exceed 1,000° F.

There is a constant and intensive effort to improve the room temperature physical properties of such materials and to increase the maximum use temperature and the environmental stability of such materials.

DISCLOSURE OF INVENTION

A fiber reinforced glass matrix composite article is disclosed. The article comprises from about 5 volume percent to about 50 volume percent monofilament fiber reinforcement, for about 15 volume percent to about 50 volume percent yarn fiber reinforcement and from about 20 volume percent to about 50 volume percent glass matrix.

The monofilament fiber reinforcement and the yarn fiber reinforcement are selectively distributed in the glass matrix to provide a fiber reinforced glass matrix composite article which exhibits high tensile strength, high tensile modulus and high fracture toughness.

The foregoing and other features and advantages of the present invention will become more apparent from the following description and accompanying drawings.

BEST MODE FOR CARRYING OUT THE INVENTION

Figure 1:
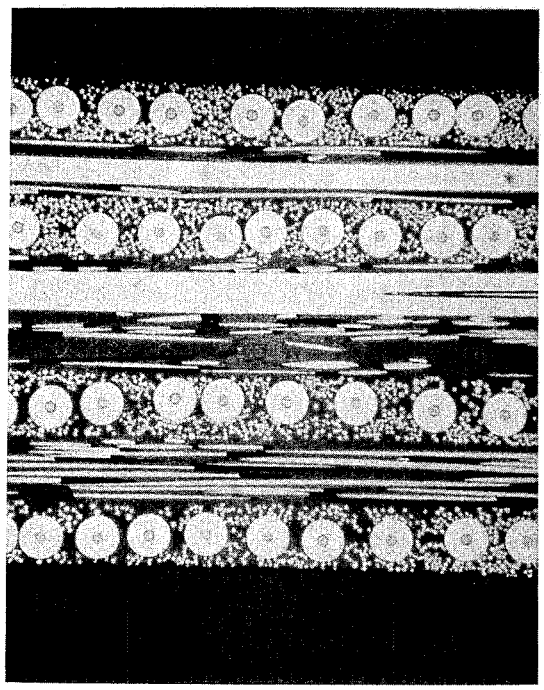
FIG. 1 shows a transverse cross-sectional view of a monofilament fiber and yarn fiber reinforced article at 50× magnification.
Figure 2:
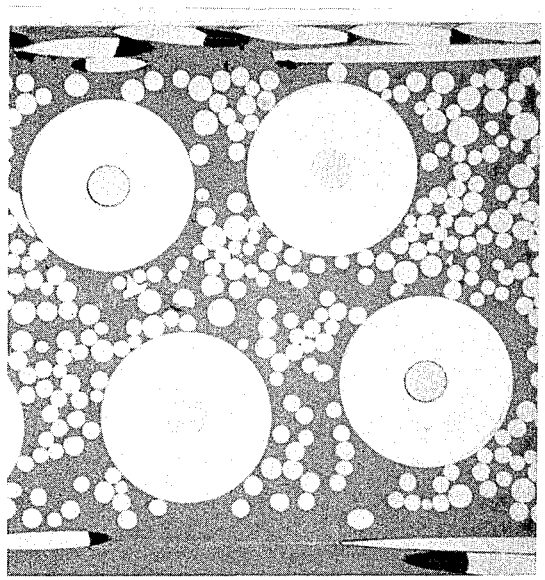
FIG. 2 shows a longitudinal cross-sectional view of the article shown in FIG. 1 at 200× magnification.

The glass matrix material of the present invention is chosen on the basis of its temperature resistance and its chemical and thermal compatibility with the fiber reinforcement. Glasses which are chemically compatible with the fiber reinforcement do not react to substantially degrade the fiber reinforcement during processing. A glass matrix material is thermally compatible with the fiber reinforcement if the coefficient of thermal expansion of the glass and the fiber reinforcement are sufficiently similar that the composite article will not delaminate during thermal cycling due to excessive thermal stresses generated by differential thermal expansion of the glass matrix and the fibers. Borosilicate glass (e.g. Corning Glass Works (CGW) 7740), alumina silicate glass (e.g. CGW 1723) and high silica glass (e.g. CGW 7930) as well as mixtures of glasses are suitable matrix materials. Glass-ceramic materials, such as lithium alumino silicate (LAS), magnesium alumino silicate (MAS), and calcium alumino silicate (CAS), which may be partially crystallized during processing, as well as mixtures of glass ceramic materials and mixtures of glass materials and glass ceramic materials may also be used as the glass matrix material of the present invention. The choice of glass matrix material is dependent upon the particular demands of the intended application. For example borosilicate glass is the preferred glass matrix material for applications which require resistance to temperature of up to about 550° C., because while its temperature resistance is low in relation to the other glass materials, borosilicate glass is more easily processed than the other glass materials. For applications which require resistance to temperatures of up to about 1200° C., glass ceramic materials, particularly LAS, are preferred matrix materials due to their superior temperature resistance.

The yarn fiber reinforcement of the present invention may comprise any inorganic yarn fiber that exhibits high tensile strength and high tensile modulus at elevated temperatures. Yarn fibers are small diameter fibers commercially available in multifilament (typically 500 or more filaments) tows. Inorganic yarn fibers are typically produced by heat treating spun organic precursor fibers and are less than 30 microns in diameter. Suitable inorganic yarn fibers include graphite fibers, silicon carbide fibers, and refractory metal oxide fibers. The choice of yarn fiber material is dependent upon the particular demands of the intended application. For applications in which high strength, high stiffness, and high fracture toughness are of primary concern, SiC fibers are preferred. Nicalon™ ceramic grade fiber (Nippon Carbon Company) is a SiC yarn that has been found to be particularly suitable for the practice of the present invention. The Nicalon yarn fiber is available in 500 filament tows with an average fiber diameter between 5-15 microns and has a tensile strength of about 2,070 Megapascals (MPa) and an elastic modulus of about 176 (GPa).

The monofilament fiber of the present invention may comprise any inorganic monofilament fiber that exhibits high tensile strength and high tensile modulus at elevated temperatures. Monofilament fibers are relatively large diameter fibers available as a single filament. Inorganic monofilament fibers are typically produced by the chemical vapor deposition of the fiber material on a carbon or tungsten core, and are typically greater than about 100 microns in diameter. Suitable inorganic monofilament fibers include silicon carbide monofilament and boron monofilament fibers. The choice of a particular monofilament is dependent upon the particular demands of the intended application. For applications in which high strength and high stiffness are of primary concern, SiC fibers are preferred. SCS-6 silicon carbide monofilament fiber available from AVCO Specialty Materials Division is particularly suitable for practice of the present invention. SCS-6 has an ultimate tensile strength of about 3,450 MPa and an elastic modulus of about 413 GPa.

The monofilament reinforcement may comprise a volume fraction of between 5 percent and 50 percent of the composite article. The yarn fiber reinforcement may comprise a volume fraction between 15 percent and 50 percent of the article. The matrix may comprise a volume fraction of between 20 percent and 50 volume percent of the article.

The relative proportions of the matrix material, the monofilament fiber reinforcement and the yarn fiber reinforcement may be selected within the above ranges to obtain a particular balance of properties in the composite article. The choice of a particular balance of properties is based on consideration of the particular demands of the intended application.

For example, in an application in which the properties of high strength, high modulus, and high fracture toughness are of primary importance, it is preferred that the matrix material comprise a volume fraction of between about 30 percent and 40 percent, the monofilament fiber reinforcement comprise a volume fraction of between about 40 percent and about 50 percent and the yarn fiber reinforcement comprise between about 20 percent to about 30 percent. By including a high volume fraction of each type of fiber reinforcement in the composite, the relative contribution of the fibers (i.e. high strength, high stiffness) to the physical properties of the composite article is increased.

The ability to control the volume fraction of both monofilament fibers and yarn fibers allows control of the overall coefficient of thermal expansion (CTE) of the composite article as well as the thermal stresses within the composite generated by the differential thermal expansion of the glass matrix and fiber materials. For example, in an application for a fiber reinforced glass matrix composite article in which it is of primary importance that the article exhibit both high stiffness and an exceptional dimensional stability (i.e. a CTE which remains nearly zero within a particular temperature range) it is preferred that the glass matrix material comprise a volume fraction between about 30 percent and 40 percent matrix material, that SiC or boron monofilament reinforcement comprises a volume percent of between 5 percent and 25 percent, and the yarn fiber reinforcement comprises from about 30 volume percent to about 50 volume percent graphite yarn fiber. In the high stiffness/near zero CTE application the negative CTE of the graphite fiber is balanced by the positive CTE of the monofilament fiber to provide a composite article having an intermediate CTE which remains nearly zero and the high fiber loading provides a composite having high stiffness.

In an application for a fiber reinforced glass matrix composite article in which nonuniform physical properties are desired, the composition of the article may vary with position within the article. For example, an article having an elastic modulus which is dependent upon position with the article may be fabricated by this technique.

The particular composition required to adjust a particular property to be within a desired range of values may be calculated using rule of mixture equations modified to reflect the presence of two types of reinforcing fibers. For example, the longitudinal and transverse moduli for a unidirectionally oriented monofilament and yarn fiber reinforced article may be predicted by the following equations (adapted from equations developed by Halpin & Tsai, J. C. Halpin, Primer on Composite Materials: Analysis, pp. 130-142, Technomic Pub. Co. Lancaster, Pa., 1984).

$$E_{11} = V_{f1}E_{11f1} + V_{f2}E_{11f2} + V_m E_m$$

and $$E_{22} = E_m \left[ \frac{(1 + \zeta \eta_2 V^*_{f2})}{(1 - \eta_2 V^*_{f2})} \right] \left[ \frac{(1 + \zeta \eta_1 V_{f1})}{(1 - \eta_1 V_{f1})} \right]$$

where
$E_{11}$ = longitudinal composite modulus
$E_{11f1}$ = fiber 1 longitudinal modulus
$E_{11f2}$ = fiber 2 longitudinal modulus
$E_{22}$ = transverse composite modulus
$E_{22f1}$ = fiber 1 transverse modulus
$E_{22f2}$ = fiber 2 transverse modulus
$E_m$ = matrix modulus
$V_{f1}$ = volume percent fiber 1
$V_{f2}$ = volume percent fiber 2
$V^*_{f2}$ = volume percent fiber 2 in glass only
$V_m$ = volume percent matrix
$\eta 1 = [(E_{f1}/E_m) - 1]/[(E_{f1}/E_m) + 2]$
$\eta 2 = [(E_{f2}/E_m) - 1]/[(E_{f2}/E_m) + 2]$
$\zeta = 2 =$ constant To obtain the improved properties exhibited by the fiber reinforced glass matrix composite article of the present invention it is important that the selected volume fraction each of the two types of reinforcing fiber is selectively distributed within the matrix material to provide an ordered microstructure. An ordered microstructure is one in which the reinforcing fibers are systematically, rather than randomly, distributed with the matrix material. A preferred ordered microstructure is one in which monofilament fibers are surrounded by yarn filament reinforced matrix material in which the yarn fibers are uniformly distributed so that there are no large glass rich regions between the monofilament fibers. Large glassy regions lower the fracture toughness of the article by providing a source of large flaws as well as a free path for crack propagation. The uniform distribution of two types of fiber reinforcement of widely dissimilar diameter allows a higher fiber packing density than may be obtained using only fibers of a similar diameter. The increased volume fraction of reinforcing fibers is reflected in the improved physical properties, particularly the high tensile strength and high elastic modulus, of the composite article.

The article of the present invention may be fabricated by the preferred process set out below or by injection of the matrix into a fiber preform as disclosed in commonly assigned U.S. Pat. No. 4,428,763, the disclosure of which is incorporated herein by reference.

The article of the present invention may be fabricated by a preferred process which the steps of includes preparing a plurality of monofilament fiber tapes, preparing a plurality of yarn fiber tapes, sandwiching each monofilament tape between two yarn tapes to form a plurality of composite plies, stacking the composite plies to form a composite preform and consolidating the composite preform to form the composite article.

The monofilament fiber tape is formed by winding a single layer of monofilament from a spool onto a rotating mandrel to provide a monofilament fiber layer having a selected number of turns of fiber per unit width of the layer and applying a film of organic binder to the layer. Any film forming organic binder may be used. Aqueous binders are preferred. A binder found to be particularly well suited to the present application is an aqueous acrylic emulsion known as Rhoplex AC-33 manufactured by Rhom and Haas. The binder is dried and the monofilament tape is removed from the mandrel and cut into sections for subsequent processing.

The yarn fiber tape is fabricated by winding a tow of yarn filaments from a spool onto a rotating mandrel. The tow is passed from the spool to the mandrel under low tension. The tow is passed through a flame or furnace to thermally decompose the sizing on the fibers. The fiber tow is wrapped around the mandrel a selected number of turns. The number of turns of yarn fiber tow is selected to provide a yarn fiber layer having a selected number of fibers per unit width of the layer. The number of fibers per unit width of the yarn fiber layer is selected to provide a selected ratio of yarn fiber to monofilament fiber in the subsequently formed composite ply. The ratio of yarn fiber to monofilament fiber in the composite ply is selected to provide the relative volume fractions of the two fibers required to obtain a particular balance of properties desired in the composite article.

A measured quantity of a slurry containing an organic binder and known concentration of a powdered matrix material is applied to the yarn fiber layer. An inert film (e.g. Mylar) is wrapped around the mandrel to cover the layer of yarn fiber and the quantity of slurry. The film prevents premature drying of the slurry and minimizes damage to the fiber during subsequent rolling procedure. The slurry and the fibers are spread over the mandrel surface by applying pressure to the film surface with a roller. It should be noted that a critical aspect of the fabrication of the yarn tape is the spreading of the yarn fibers evenly across the mandrel surface to obtain a uniform distribution of yarn fiber per unit width of the fiber layer. The rolling process evenly forces the slurry between the fibers. The loosely wound yarn fibers move laterally with the slurry and spread across the surface of the mandrel. The rolling is continued until a substantially uniform distribution of fibers and slurry is obtained. The film is then removed and the slurry is dried by exposure to a heat source to form a yarn fiber tape. Once dry, the tape is cut in a direction parallel to the longitudinal axis of the mandrel and removed from the mandrel. After removal from the mandrel the tape is cut into sections suitable for subsequent processing steps.

The individual composite plies are formed by sandwiching one section of monofilament tape between two sections of yarn tape. The sections of tape are aligned such that the yarn and monofilament fibers run parallel to each other in the composite ply.

The composite plies are stacked in a desired composite preform. The layup may be warm molded to partially debulk the preform and to help move the yarn filaments in between the monofilament fibers. The binder is then thermally decomposed by heating the preform, preferably in air. If graphite fibers are used, the binder must be decomposed in an inert atmosphere to avoid degradation of the graphite fibers.

The preform is then consolidated to form the composite article. The preform may be consolidated by hot pressing, by hot isostatic pressing, by hot pultrusion or by hot rolling.

EXAMPLE

A monofilament fiber tape was fabricated. AVCO SCS-6 silicon carbide monofilament fiber was wound on a 12 inch diameter round mandrel. The mandrel was covered with a 0.001 inch thick film of inert material (Mylar). The monofilament was wound on the covered mandrel at 128 turns per inch for a width of 4 inches. A layer of binder (Rhoplex AC-33) was applied with a paint brush to coat the monofilament layer. The coated monofilament layer was dried on the mandrel with a heat lamp for 30 minutes to form a monofilament tape. Once dried, the tape was cut at one location and removed from the mandrel and then cut into 4"×4" sections.

Two yarn fiber tapes were fabricated. For each tape, a 12 inch diameter mandrel was tightly wrapped with a 0.001 inch thick film of inert material (Mylar). A ⅛ inch diameter tensioning rod was inserted under the film parallel to the longitudinal axis of the mandrel. A tow of Nicalon silicon carbide yarn fibers was drawn off a spool with no applied back tension, passed through a flame to thermally decompose the yarn sizing, and wound on the mandrel at 7 turns per inch for a width of 4 inches. After winding the tensioning rod was removed to loosen the yarn turns. A slurry comprising one part by weight CGW 7740 borosilicate glass powder and 2 parts by weight Rhoplex AC-33 acrylic binder was mixed. Pools of the slurry (totaling 24.7 grams) were applied to the fibers with a spoon at relatively uniform spacing. A layer of 0.001 inch thick inert film (Mylar) was wrapped around the fiber/slurry layer on the mandrel. The slurry was evenly distributed over the fibers and the fibers were spread across the surface of the mandrel by applying light pressure to the fiber/slurry layer in the direction of the fiber axis with a 4" wide, 1" diameter hand held rubber roller. The film was removed and the tape was dried with a heat lamp for 30 minutes to form a yarn fiber tape. The tape was cut in one location and removed to the mandrel. The tape was cut into eight 4"×4" sections.

Hybrid composite plies were formed by sandwiching a 4"×4" section of the monofilament tape between two sections 4"×4" yarn tape. Eight individual hybrid composite plies were formed in this manner. The hybrid composite plies were stacked in a 0°/90°. orientation with symmetry about the center line. The laid up stack was warm molded at 150° C. and 100 psi for 10 minutes. The stack was then placed between ceramic platens and the binder was thermally decomposed by heating at 500° C. for 2 hours in the air. The layup was then rigidized by heating to 700° C. for 10 minutes in air to lightly fuse the glass particles together The composite preform was then vacuum hot pressed at 1,250° C. for 30 minutes at 1,000 psi to consolidate the composite article.

The physical properties of the article so formed were measured and compared to an analogous monofilament reinforced article. The results are shown in Table 1.

TABLE 1

| | | Monofilament/ yarn Reinforcement | Monofilament Reinforcement |
|---|---|---|---|
| Composite Number | | 383-86 | 159-86 |
| Fiber v/o | | | |
| SiC monofilament | | 39.2 | 38.6 |
| SiC yarn | | 23.0 | 0 |
| 7740 glass | | 33.8 | 58.2 |
| Lay-up | | 0/90 | 0/90 |
| Tensile Strength | (MPa) | 496 | 348 |
| | (ksi) | 72 | 50 |
| Strain to Failure | (%) | 0.56 | 0.45 |
| Prop. Limit Stress | (MPa) | 57 | 33 |
| | (ksi) | 8 | 5 |
| Prop. Limit Strain | (%) | 0.038 | 0.031 |
| Elastic Modulus | (GPa) | 145 | 101 |
| | (Msi) | 21 | 15 |
| Flexural Strength | (MPa) | 1,041 | 584 |
| | (ksi) | 151 | 85 |
| Coef. Thermal Exp. ($\times 10^{-6}/°C$) 25 to 300° C. | | 2.4 | 4.9 |

Cross-sectional views of the article, showing the distribution of the monofilament and yarn fiber reinforcements are shown in FIGS. I and II. FIG. I shows a transverse cross-sectional view of the article and FIG. II shows an enlarged longitudinal cross-sectional view of the article.

In each of the Figures, large diameter (nominally 144 micrometers) monofilament fibers are surrounded by small diameter (nominally 5-15 micrometers) yarn fiber reinforced glass matrix. It is important to note that the yarn fibers are uniformly distributed throughout the glass matrix, i.e., the yarn fibers are not distributed in discrete layers, and there are no large glass rich regions between the monofilament fibers. The preferred fiber distribution is most clearly visible in FIG. II.

The monofilament and yarn reinforced composite article of the present invention exhibited higher tensile strength, a higher elastic modulus, and much higher flexural strength than that exhibited by the monofilament reinforced article.

Although this invention has been shown and described with respect to detailed embodiments thereof, it will be understood by those skilled in the art that various changes in form and detail thereof may be made without departing from the spirit and scope of the claimed invention.

We claim:

1. A consolidated fiber reinforced glass matrix composite article, comprising:
   from about 20 volume percent to about 50 volume percent glass or glass ceramic matrix,
   from about 5 volume percent to about 50 volume percent inorganic monofilament fiber reinforcement wherein the individual monofilament fiber diameter is greater than about 100 microns, and
   from about 15 volume percent to about 50 volume percent inorganic yarn fiber reinforcement wherein the individual yarn fiber diameter is less than about 30 microns,
   wherein the monofilament fiber reinforcement includes a plurality of substantially parallel monofilament fibers arranged in a first layer during a preliminary layup of the article,
   wherein the yarn fiber reinforcement includes a plurality of substantially parallel yarn fibers arranged during the preliminary layup in a second layer, the yarn fiber layer disposed adjacent to the first layer with the yarn fibers oriented substantially parallel to the monofilament fibers, and
   wherein the monofilament fiber reinforcement and yarn fiber reinforcement are selectively distributed in the glass or glass ceramic matrix so that each monofilament fiber, following consolidation of the preliminary layup, is separated from adjacent monofilament fibers by yarn fiber reinforcement in glass or glass ceramic matrix to provide a consolidated fiber reinforced glass matrix article which exhibits high tensile strength, high elastic modulus, and high fracture toughness.

2. The fiber reinforced glass matrix composite article of claim 1, wherein the glass matrix comprises borosilicate glass.

3. The fiber reinforced glass matrix composite article of claim 1, wherein the glass ceramic matrix comprises lithium alumino silicate glass ceramic.

4. The fiber reinforced glass matrix composite article of claim 1, wherein the monofilament reinforcement comprises silicon carbide monofilament fiber and the yarn fiber reinforcement comprises silicon carbide yarn fiber.

5. The fiber reinforced glass matrix composite article of claim 1, wherein the monofilament fiber comprises silicon carbide fiber and the yarn fiber reinforcement comprises graphite yarn fiber.

6. The fiber reinforced glass matrix composite article of claim 1, wherein the monofilament fiber reinforcement comprises boron monofilament fiber and the yarn fiber reinforcement comprises graphite yarn fiber.

* * * * *